(12) United States Patent
Solomon et al.

(10) Patent No.: US 8,816,972 B2
(45) Date of Patent: Aug. 26, 2014

(54) DISPLAY WITH CURVED AREA

(75) Inventors: Mark C Solomon, San Jose, CA (US);
April Slayden Mitchell, San Jose, CA (US); Ian N Robinson, Pebble Beach, CA (US); Glenn A Wong, Foster City, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 310 days.

(21) Appl. No.: 13/066,975

(22) Filed: Apr. 28, 2011

(65) Prior Publication Data

US 2012/0274575 A1  Nov. 1, 2012

(51) Int. Cl.
*G09G 5/00* (2006.01)
*G06F 3/0488* (2013.01)
*G06F 1/16* (2006.01)
*G09G 3/20* (2006.01)

(52) U.S. Cl.
CPC .......... *G06F 3/0488* (2013.01); *G09G 2354/00* (2013.01); *G09G 2380/02* (2013.01); *G06F 1/1601* (2013.01); *G09G 2340/14* (2013.01); *G09G 3/20* (2013.01)
USPC ........................................................ 345/173

(58) Field of Classification Search
CPC . G06F 1/1601; G06F 3/0488; G09G 2340/14; G09G 2354/00; G09G 2380/02; G09G 3/20
USPC ............................................................ 345/173
See application file for complete search history.

(56) References Cited

U.S. PATENT DOCUMENTS

| 7,667,891 | B2 | 2/2010 | Cok et al. | |
| 2008/0226846 | A1* | 9/2008 | Hill | 428/13 |
| 2010/0020026 | A1* | 1/2010 | Benko et al. | 345/173 |
| 2010/0023895 | A1 | 1/2010 | Benko et al. | |
| 2010/0270257 | A1 | 10/2010 | Wachman et al. | |

FOREIGN PATENT DOCUMENTS

| CN | 101290445 | 10/2008 |
| CN | 101813993 | 8/2010 |

OTHER PUBLICATIONS

Mitsubishi Puts Out Curved, Wrap-around OLED Display http://www.electronista.com/articles/11/02/04/mitsubishi.shows.curved.commercial.oled.dis.

* cited by examiner

*Primary Examiner* — Quan-Zhen Wang
*Assistant Examiner* — Tony Davis
(74) *Attorney, Agent, or Firm* — Neel Patel

(57) ABSTRACT

Example embodiments disclosed herein relate to display device having a first display plane, a second display lane, and a curved area between the first and second display planes. The first and second planes and the curved area form a continuous display surface having four edges. Only three of the four edges are viewable by a user when viewing one of the first and second display planes.

15 Claims, 5 Drawing Sheets

DISPLAY WITH CURVED AREA

BACKGROUND

An increase in complexity and/or interactivity of applications as well as a number of the applications being simultaneously used has resulted in larger displays. Device manufacturers of displays are challenged to provide displays that can accommodate for the increased number, complexity and/or interactivity of the applications.

BRIEF DESCRIPTION OF THE DRAWINGS

The following detailed description references the drawings, wherein.

DETAILED DESCRIPTION

Specific details are given in the following description to provide a thorough understanding of embodiments. However, it will be understood by one of ordinary skill in the art that embodiments may be practiced without these specific details. For example, systems may be shown in block diagrams in order not to obscure embodiments in unnecessary detail. In other instances, well-known processes, structures and techniques may be shown without unnecessary detail in order to avoid obscuring embodiments.

A user may interact with an application via a display. However, applications have increased in complexity and/or in user interactivity. For example, a user may interact with the application via a touch enabled interface of the display. Further, more applications are being simultaneously used by users. Accordingly, the user may have difficulty sorting and/or interacting with one or more of the applications beings viewed on the display.

Embodiments provide a display that allows users to more effectively organize, view and/or interact with applications. For example, embodiments may provide a display having two display planes separated by a curved part. The display planes and curved parts may be used by the user to create separate interaction areas, where user objects of applications may have different properties in the each of the separate interaction areas. For example, the curved area may allow an application to simulate a rotational user interface while one of the display planes may provide a work area to minimize or hide applications. In addition, some embodiments may also allow the user to drag the user objects across the display planes and curved part using a continuous touch motion.

Figure 1A:
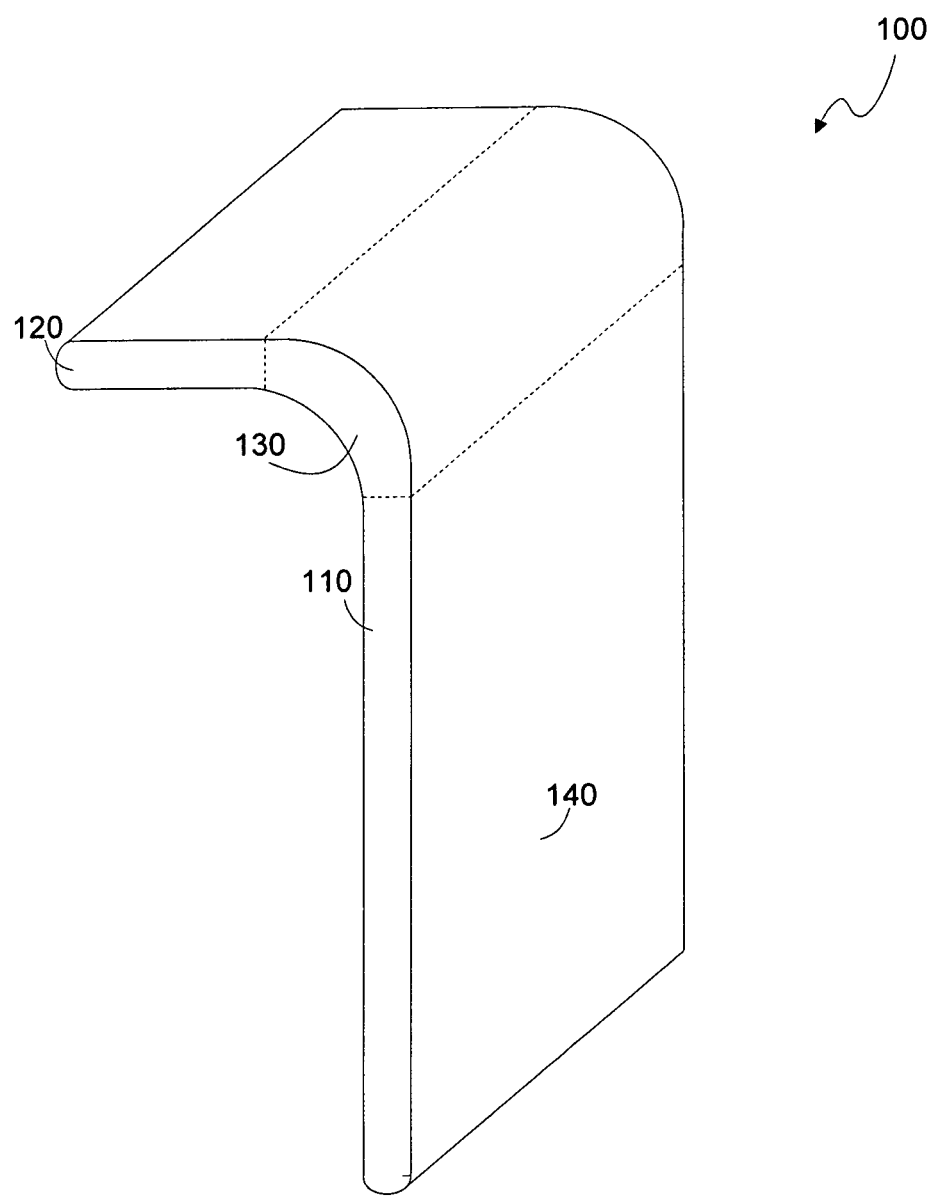
FIG. 1A is an example block diagram of a perspective view of a display.

FIG. 1A is an example block diagram of a perspective view of a display 100. In the embodiment of FIG. 1, the display 100 includes a first display plane 110, a second display plane 120, and a curved area 130 between the first and second display planes 110 and 120. The first display plane 110, the second display plane 120, and the curved area 130 are shown to be separated by dotted lines. In one embodiment, the first and second displays planes 110 and 120 and the curved area 130 may be formed from a single flexible display. In another embodiment, the curved area 130 and one of the first and second display planes 110 and 120 are formed from a single flexible display. A remaining one of the first and second display planes 110 and 120 may be formed from a rigid display. In yet another embodiment, both the first and second display planes 110 and 120 may be formed from a rigid display and the curved area 130 may include at least one of a flexible display and a rear projector. However, embodiments are not limited thereto and may include various other combinations of displays.

The term display may refer to any type of electronic visual display. Examples of the display may include an integrated display device, such as a Liquid Crystal Display (LCD) panel or other type of display panel. The term display may also include one or more external display devices, such as an LCD panel, a plasma panel, a Cathode Ray Tube (CRT) display, or any other display device. Flexible displays may include any type of display composed of a flexible substrate that can bend, flex, conform, etc., such as organic light emitting diode (OLED) or electronic ink displays. A rigid display may include any type of display having a rigid surface that cannot bend, flex, conform, etc., such as LCDs or CRTs.

The first display plane 110, the second display plane 120 and/or the curved area 130 may be a combination of different types of displays and/or have different resolution capacities.

As shown in FIG. 1A, the first and second display planes 110 and 120 and the curved area 130 form a continuous display surface 140 having four edges. Further, a surface area of the second display plane 120 is substantially smaller than a surface area of the first display plane 110. Accordingly, the first display plane 110 may provide a main user interface and the second display plane 120 may provide a peripheral interface. In addition, the first and second display planes 110 and 120 are shown to be substantially flat in FIG. 1A. However, embodiments of the first and second display planes 110 and 120 are not limited thereto and may have various sizes, shapes, curvatures, etc.

Figure 1B:
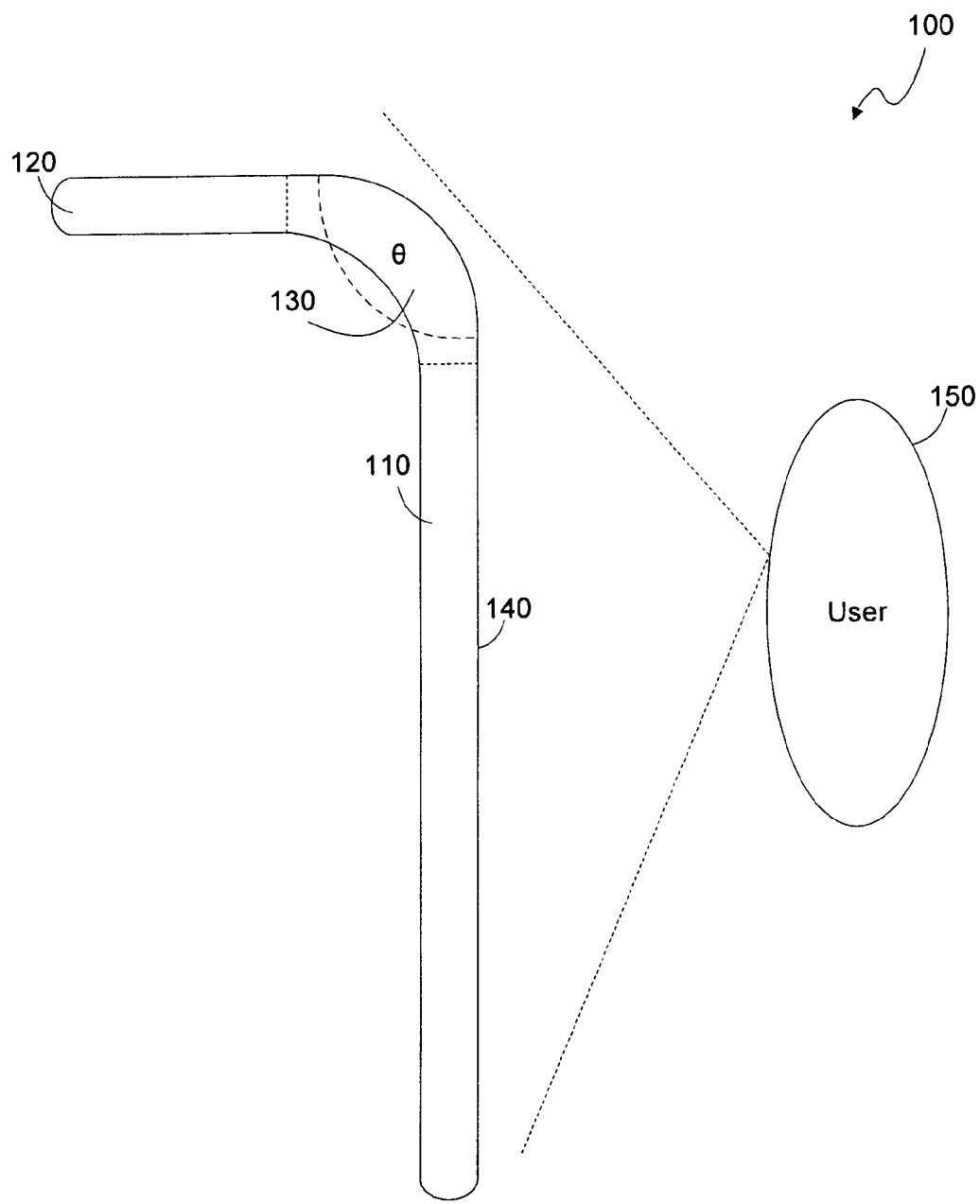
FIG. 1B is an example block diagram of a side-view of the display of FIG. 1A with respect to a first user position.
Figure 1C:
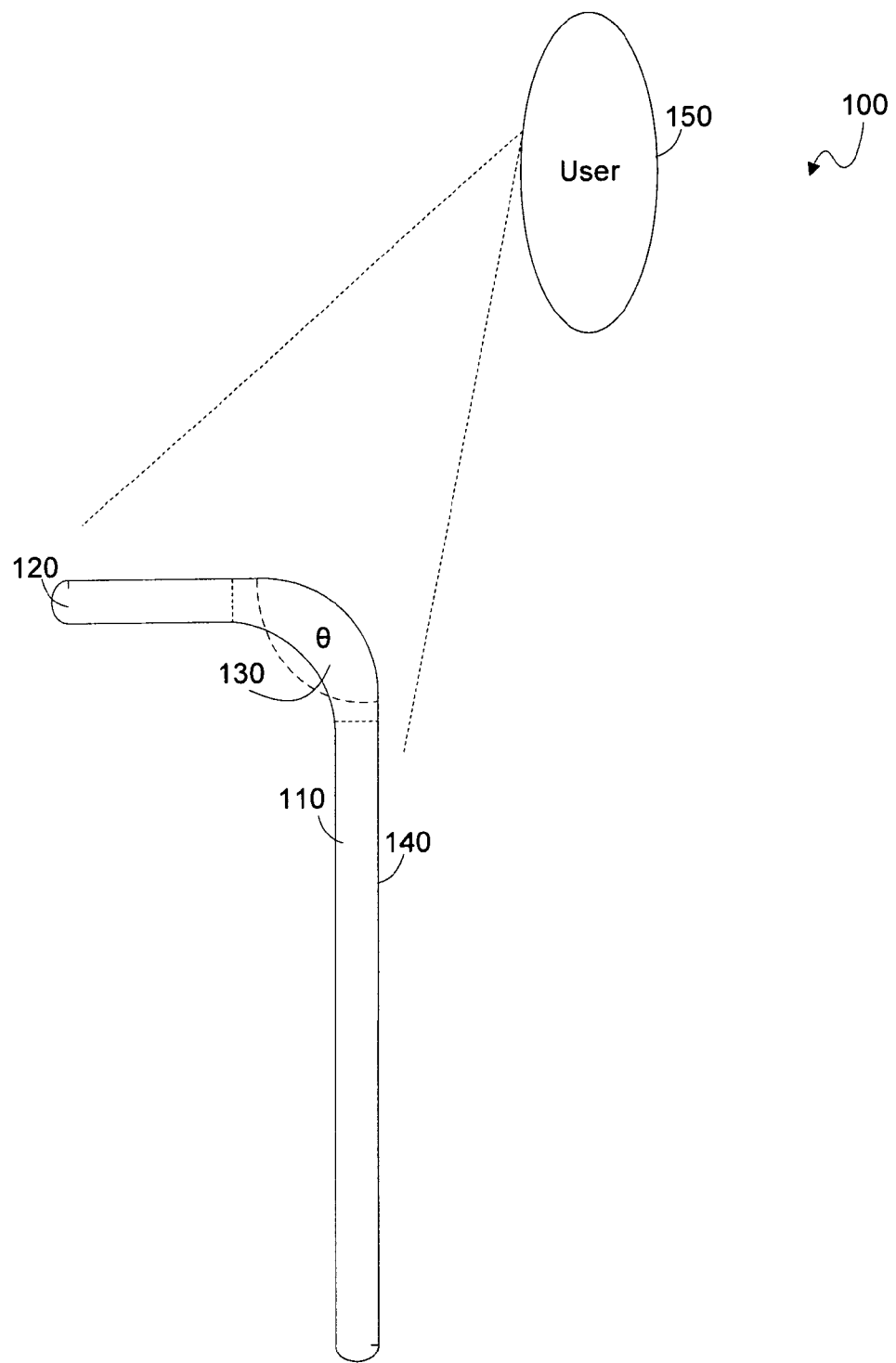
FIG. 1C is an example block diagram of a side-view of the display of FIG. 1A with respect to a second user position.

FIG. 1B is an example block diagram of a side-view of the display of FIG. 1A with respect to a first user position and FIG. 1C is an example block diagram of a side-view of the display of FIG. 1A with respect to a second user position. As shown in FIGS. 1B and 1C, only three of the four edges are viewable by a user 150 when viewing one of the first and second display planes 110 and 120. For example, in FIG. 1B, when the user 150 is viewing the first display plane 110, such as when the user 150 is sitting, the user 150 may not see a top edge of the display 100, which is located at the second display plane 120. Conversely, when the user 150 is viewing the second display plane 120, such as when the user 150 is standing, the user 150 may not see a bottom edge of the display 100, which is located at the first display plane 110.

Thus, the second display plane 120 is not fully visible to the user 150 when viewing the first display plane 110 and the first display plane 110 is not fully visible to the user 150 when viewing the second display plane 120. As a result, should the user 150, for example, wish to hide or minimize from view a user object being displayed on the display 100, such as a window of an application, the user 150 may drag the user object to one of the first and second display planes 110 and 120 that is not fully visible.

An application may refer to any type of software running on a computing device (not shown) used by a user. Examples of a computing device may include, for example, a notebook computer, a desktop computer, an all-in-one system, a slate computing device, a portable reading device, a wireless email device, a mobile phone, and the like designed to help the user 150 to perform singular or multiple related specific tasks. The user 150 may view and/or interact with the user application via an interface and/or connection between the display 100 and the computing device. The display 100 may be integrated into the computing device or separate from the computing device.

The computing device may include one or more central processing units (CPUs), semiconductor-based microprocessors, and/or other hardware devices suitable for access and execution of instructions stored in a machine-readable storage medium. The machine-readable storage medium may be any electronic, magnetic, optical, or other physical storage device. For example, the machine-readable storage medium may store one or more of the applications executable by the CPU.

In FIGS. 1B-1C, an angle θ between first display plane 110 and the second display plane 120 at the curved area 130 is shown to be approximately 90 degrees. However, embodiments may include various degrees for the angle θ, such as approximately between 45 and 90 degrees. The second display plane 120 and the curved area 130 are positioned above the first display 110. The curved area 130 is bent at the angle θ away from the user 150.

Figure 2A:
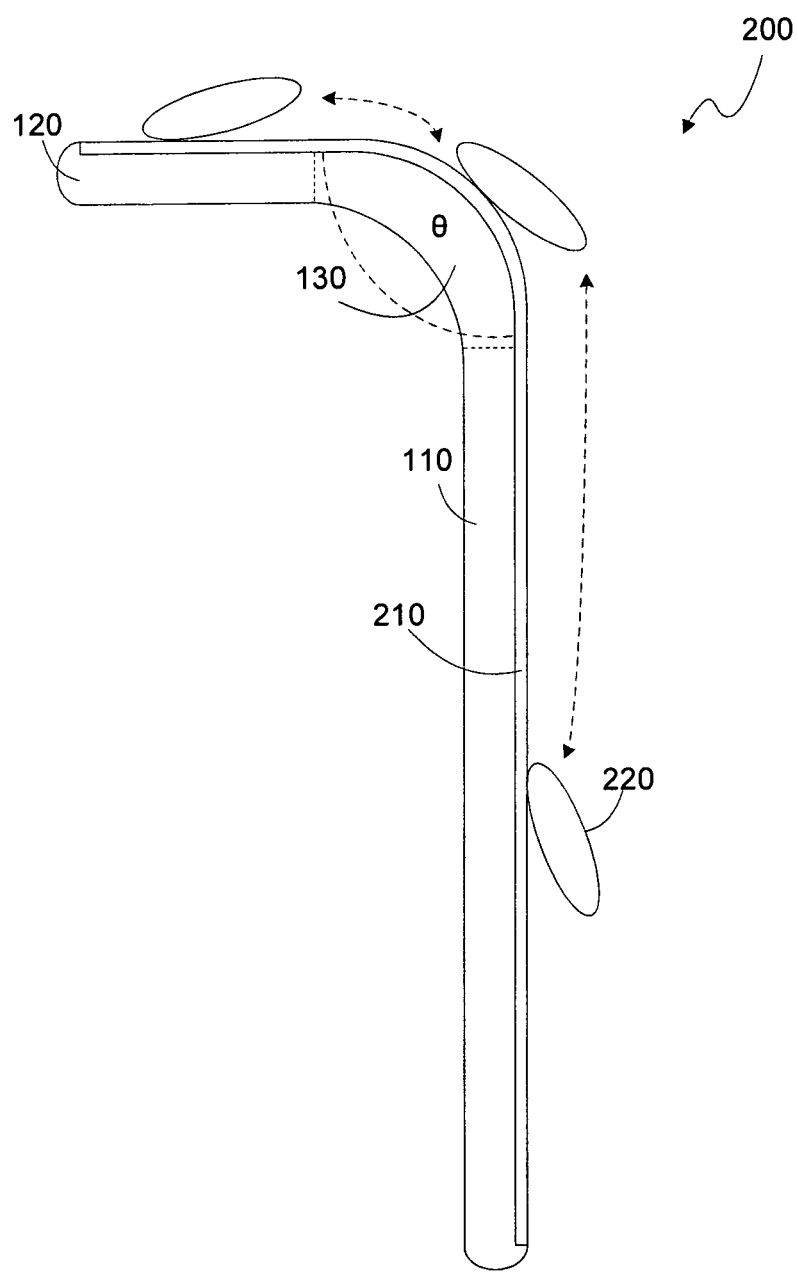
FIG. 2A is an example block diagram of a side-view of another display with respect to a touch motion by a user.

FIG. 2A is an example block diagram of a side-view of another display 200 with respect to a touch motion by the user 150. In the embodiment of FIG. 2A, the display 200 is similar to the display 100, except that the display 200 includes a touch sensitive surface 210 over the first display plane 110, the second display plane 120 and the curved area 130. The curved area 130 includes a convex surface along the touch sensitive surface 210.

Examples of technologies related to the touch sensitive surface 210 may include surface acoustic wave technology, resistive touch technology, capacitive touch technology, infrared touch technology, dispersive signal technology, acoustic pulse recognition technology, various multi-touch technologies, and the like.

An interaction object 220 is shown to glide along the touch sensitive surface 210 in a continuous or uninterrupted motion from the first display plane 110 to the curved area 130 to the second display plane 120. The interaction object 220 may represent any type of physical article used by the user 150 to interact with the touch sensitive surface 210, such as a hand or finger of the user 150 or a marking device like a stylus.

Thus, embodiments may allow the user 150 to access the user object by, for example, touching the user object on the display 200 via the interaction object 220. Then, without lifting the interaction object 220, the user 150 may glide the interaction object 220 along any part of the touch sensitive surface 210 in order to drag the user object to any one of the first display plane 110, the second display plane 120 and the curved area 130.

However, embodiments are not limited to the motion described above. The user object may be displayed at any one of the first display plane 110, the second display plane 120 and the curved area 130. Further, the user object may be continuously dragged by the user 150 over an entirety of the touch sensitive surface 210 using the continuous motion. Thus, at least one of first and second display planes 110 or 120 are touchable by the user 150 when viewing an other of the first and second display planes 110 or 120.

Figure 2B:
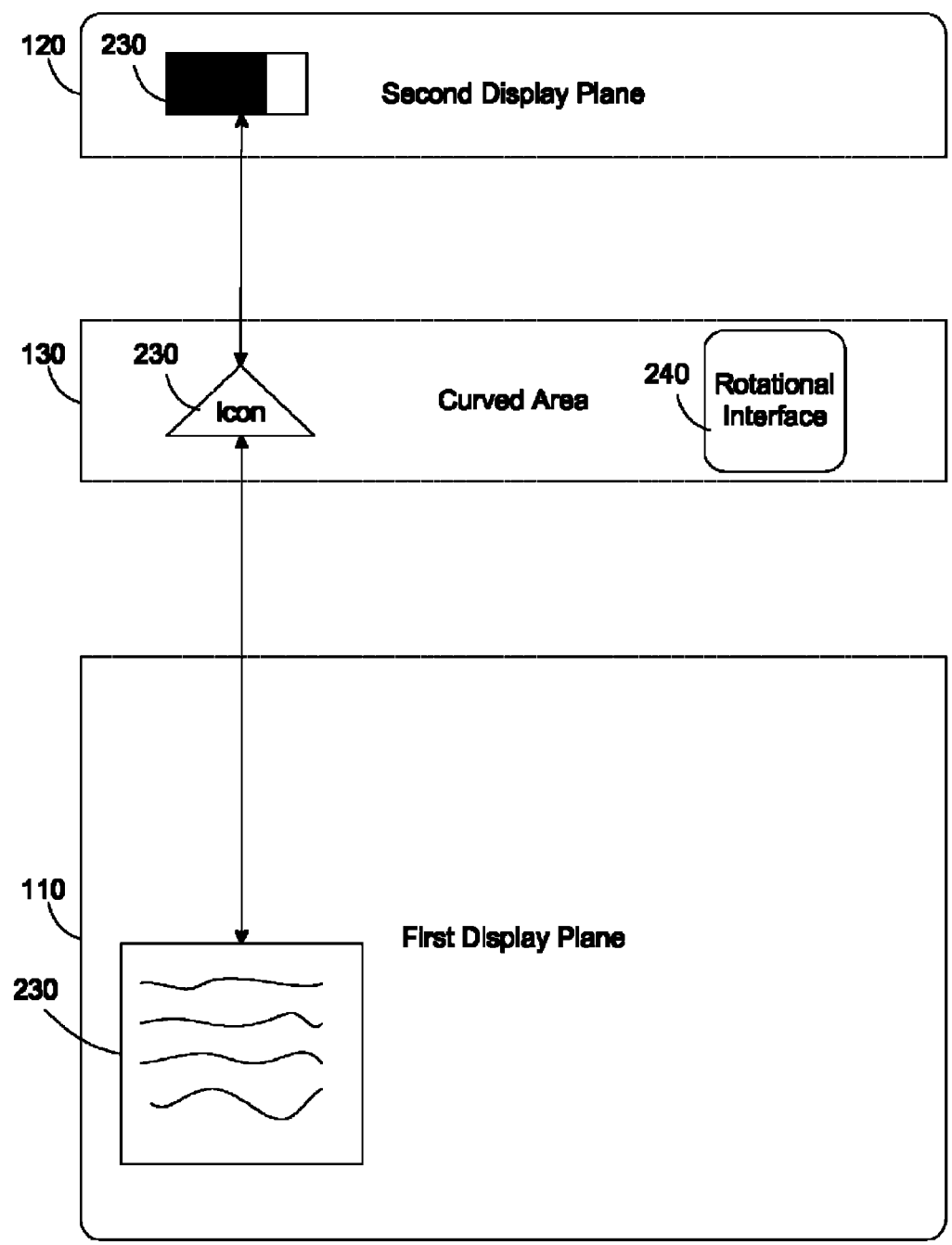
FIG. 2B is an example block diagram of a segmented front-view of the display of FIG. 2A.

FIG. 2B is an example block diagram of a segmented front-view of the display 200 of FIG. 2A. In FIG. 2B, one or more properties of the user object 230 are shown to change when dragged to at least one of the first display plane 110, the second display plane 120 and the curved area 130. The properties of the user object 230 may relate to size, shape, content, and the like. For example, the user object 230 may be window, such as text document, in the first display plane 110. However, the user object 230 may be minimized to an icon when dragged to the curved area 130. Further, the user object 230 may become a status identifier indicating, for example a percentage of completion or capacity, when dragged to the second display plane 120. However, embodiments may also include the user object 230 having none of its properties change or various other types of properties change when being dragged to any one of the first display plane 110, the second display plane 120 and the curved area 130.

The display 200 may also output various types of interactive interfaces, such as a rotational interface 240 at the curved area 130. In this case, the rotational interface 240 may use the convex surface of the curved area 130 to simulate a rotatable motion such as that of a wheel, dial, wheel, etc. For example, the rotational interface 240 may respond to a touch motion of the user 150 parallel to a curve of the convex surface of the curved area 130 and/or display a rotating image in a direction parallel to the curve of the convex surface of the curved area 130.

In embodiments, the user object 230 and/or interactive interfaces, such as the rotational interface 240, may have different properties at different parts of the display 200 based on an orientation, shape, size, etc. of the display and/or the user's 150 needs. For example, the second display panel 120 may show information in a brief format, such as the status identifier, to notify the user 150 of the information even when the user 150 cannot see the first display 110. Such situations may arise, for instance, when the second display plane 120 is used as a lip of a mobile device or a top portion of a desktop display where the user is standing above the desktop display. The user 150 may then instantly access the information at the second display plane 120 as well as drag the information from the second display plane 120 to the curved area 130 or the first display plane 110 using a single continuous touch motion.

Although the user object 230 and/or interfaces are described above with respect to the display 200, the user object 230 and/or interfaces may also be displayed similarly at the display 100. However, the user object 230 and/or interfaces may be accessed and/or dragged without touching the display 100, such as via a mouse or keyboard interfacing with the display 100.

According to the foregoing, embodiments provide a method and/or device for allowing a user to drag user objects across a first display plane, a curved part, and a second display plane using a continuous touch motion. Further, a convex surface of the curved part may be used by applications to simulate physically curved interfaces to the user. In addition, the user may interact with applications differently and/or separately at the first display plane, curved part, or second display plane.

What is claimed is:

1. A display device, comprising:
an electronic visual display comprising:
   a first display plane;
   a second display plane; and
   a curved area between the first and second display planes, wherein the first and second planes and the curved area form a continuous display surface,
   wherein,
the first display plane is to display a user object with a first property, and at least one of the second display plane and the curved area are to display the user object with a second property, and
an appearance of the user object being displayed is changed from being displayed with the first property to being displayed with the second property when the user object is dragged between the first display plane and one of the second display plane and the curved area.

2. The display device of claim 1, further comprising:
a touch sensitive surface over the first display plane, the second display plane and the curved area,
the curved area includes a convex surface along the touch sensitive surface, and
the user object displayed by at least one of the first display plane, the second display plane and the curved area is to be continuously dragged over an entirety of the touch sensitive surface by a user.

3. The display device of claim 2, wherein the curved area is to output a rotational interface to rotate in a direction parallel to a curve of the convex surface.

4. The display device of claim 2, wherein a property of the user object is to change when the user object is dragged to at least one of the first display plane, the second display plane and the curved area, the property including at least one of a size, shape, and content of the user object.

5. The display of claim 1, wherein,
the first and second display planes are substantially flat,
the second display plane is not fully visible to the user when viewing the first display plane, and
the first display plane is not fully visible to the user when viewing the second display plane.

6. The display device of claim 1, wherein at least one of first and second display planes are touchable by the user when viewing an other of the first and second display planes.

7. The display device of claim 1, wherein a surface area of the second display plane is substantially smaller than a surface area of the first display plane.

8. The display device of claim 1, wherein,
at least one of the second display plane and the curved area is positioned above the first display plane, and
the curved area is bent at an angle away from the user.

9. The display device of claim 1, wherein the first display plane is angled at between approximately 45 and approximately 90 degrees with respect to the second display plane.

10. The display device of claim 1, wherein the first and second display planes and the curved area are formed from a single flexible display.

11. The display device of claim 1, wherein,
at least one of the first and second display planes is formed from a rigid display, and
the curved area includes at least one of a flexible display and a rear projector.

12. The display device of claim 11, wherein the curved area and one of the first and second display planes are formed from a single flexible display.

13. A method of displaying a user object with an electronic visual display device, the method comprising:
receiving, at a computing device, an indication of a user interacting with the electronic visual display device, the electronic visual display device including a first display plane, a second display plane, and a curved area between the first and second display planes, the first and second display planes and the curved area to form a continuous display surface;
displaying the user object in the first display plane with a first property;
displaying the user object in at least one of the second display plane and the curved area with a second property; and
causing an appearance of the user object to be changed from being displayed with the first property to being displayed with the second property when the user object is dragged between the first display plane and one of the second display plane and the curved area.

14. The method of claim 13, wherein the interacting includes:
accessing the user object at one of the first display plane, the second display plane and the curved area via a touch sensitive surface over the first display plane, the second display plane and the curved area, and
dragging the user object to an other of the first display plane, the second display plane and the curved area via a continuous touch motion over the touch sensitive surface by the user, wherein
the curved area is between the first and second display planes and includes a convex surface along the touch sensitive surface.

15. The method of claim 14, wherein the interacting further includes:
accessing a rotational interface at the curved area, wherein the rotational interface responds to a touch motion parallel to a curve of the convex surface.

* * * * *

UNITED STATES PATENT AND TRADEMARK OFFICE
CERTIFICATE OF CORRECTION

| | | |
|---|---|---|
| PATENT NO. | : 8,816,972 B2 | Page 1 of 1 |
| APPLICATION NO. | : 13/066975 | |
| DATED | : August 26, 2014 | |
| INVENTOR(S) | : Mark C Solomon et al. | |

It is certified that error appears in the above-identified patent and that said Letters Patent is hereby corrected as shown below:

In the Claims

Column 5, line 20, in Claim 5, delete "display" and insert -- display device --, therefor.

Signed and Sealed this
Tenth Day of February, 2015

Michelle K. Lee
*Deputy Director of the United States Patent and Trademark Office*